US010647076B2

(12) United States Patent
Van Werven et al.

(10) Patent No.: US 10,647,076 B2
(45) Date of Patent: May 12, 2020

(54) STRETCHING DEVICE FOR AN APEX FILLER STRIP FOR TIRE BEADS AND APEX HANDLING SYSTEM COMPRISING THE STRETCHING DEVICE

(71) Applicant: VMI HOLLAND B.V., RK Epe (NL)

(72) Inventors: Timen Anton Van Werven, JE Apeldoorn (NL); Egbert Grietinus Kelly, BM Ruinen (NL); Martinus Regterschot, NG Wapenveld (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 15/502,740

(22) PCT Filed: Jul. 24, 2015

(86) PCT No.: PCT/NL2015/050543
§ 371 (c)(1),
(2) Date: Feb. 8, 2017

(87) PCT Pub. No.: WO2016/022025
PCT Pub. Date: Feb. 11, 2016

(65) Prior Publication Data
US 2017/0232698 A1 Aug. 17, 2017

(30) Foreign Application Priority Data
Aug. 8, 2014 (NL) ..................................... 2013314

(51) Int. Cl.
*B29D 30/48* (2006.01)
*B29D 30/44* (2006.01)
(52) U.S. Cl.
CPC ............. *B29D 30/44* (2013.01); *B29D 30/48* (2013.01); *B29D 2030/481* (2013.01)

(58) Field of Classification Search
CPC ........ B29D 2030/481; B29D 2030/482; B29D 2030/487; B29D 30/44; B29D 30/48; B29C 55/00
See application file for complete search history.

(56) References Cited

U.S. PATENT DOCUMENTS 4,354,892 A    10/1982   Tarantola et al. ............. 156/398
4,724,873 A *   2/1988   Abe ....................... B29D 30/48
                                                                                        140/92.2

(Continued)

FOREIGN PATENT DOCUMENTS

CN       202045891     11/2011  ............ B29D 30/50
CN       103707531      4/2014  ............ B29D 30/06

(Continued)

OTHER PUBLICATIONS

International Search Report and Written Opinion issued in application No. PCT/NL2015/050543, dated Dec. 7, 2015 (11 pgs).

(Continued)

*Primary Examiner* — Geoffrey L Knable
(74) *Attorney, Agent, or Firm* — Hayes Soloway PC

(57) ABSTRACT

Provided is a stretching device for stretching an apex filler strip prior to application to a bead for a tire. The stretching device includes a stretching roller and a plurality of guide rollers for guiding the apex filler strip in a loop around the stretching roller. The plurality of guide rollers is arranged for receiving the apex filler strip in an entry orientation and for discharging the apex filler strip in an exit orientation. The plurality of guide rollers is arranged for guiding the one side of the apex filler strip in the entry orientation and the exit orientation under angles different from the support angle (H) with respect to rotation axis (R) of the stretching roller such that the apex filler strip is twisted over a twisting angle of at least forty-five degrees.

30 Claims, 10 Drawing Sheets

(56) References Cited

U.S. PATENT DOCUMENTS

| | | | | |
|---|---|---|---|---|
| 5,100,497 A | 3/1992 | Moody et al. | | 156/460 |
| 5,775,562 A | 7/1998 | Jungk et al. | | 226/21 |
| 6,264,780 B1 | 7/2001 | Iwanaga et al. | | 156/136 |
| 6,524,416 B1* | 2/2003 | Kubinski | | B29D 30/48 |
| | | | | 156/131 |
| 2005/0139324 A1* | 6/2005 | Meyer | | B21C 47/26 |
| | | | | 156/397 |
| 2009/0266474 A1* | 10/2009 | Matsuyama | | B29D 30/48 |
| | | | | 156/136 |

FOREIGN PATENT DOCUMENTS

| | | | | |
|---|---|---|---|---|
| DE | 2803460 | 8/1979 | | B29C 53/02 |
| EP | 0 771 643 | 5/1997 | | B29D 30/00 |
| JP | 2002187218 | 7/2002 | | B29D 30/48 |
| JP | 2011240601 | 12/2011 | | B29D 30/48 |
| SU | 1407846 | 7/1988 | | B29D 30/44 |
| SU | 1636249 | 3/1991 | | B29D 30/48 |
| WO | WO 0023262 | 4/2000 | | B29D 30/48 |
| WO | WO-01/17762 A1 * | 3/2001 | | B29D 30/48 |

OTHER PUBLICATIONS

International Preliminary Report on Patentability issued in application No. PCT/NL2015/050543, dated Feb. 14, 2017 (7 pgs).
Notification of Refusal of Korean Patent Application Serial No. 10-2016-7001350, dated Feb. 29, 2017 with translation (3 pages).
Decision to Grant Korean Patent Application Serial No. 10-2016-7001350, dated Jul. 28, 2017 (1 page).
Japanese Decision to Grant (w/machine translation) issued in application No. 2017-506731, dated Apr. 24, 2018 (6 pgs).
Chinese Action issued in Serial No. 201580050239.2 dated Jul. 4, 2018 (with English translation) 10 pgs.
Russian Decision to Grant (w/machine translation) issued in application No. 2017107174, dated Jan. 18, 2019 (6 pgs).

* cited by examiner

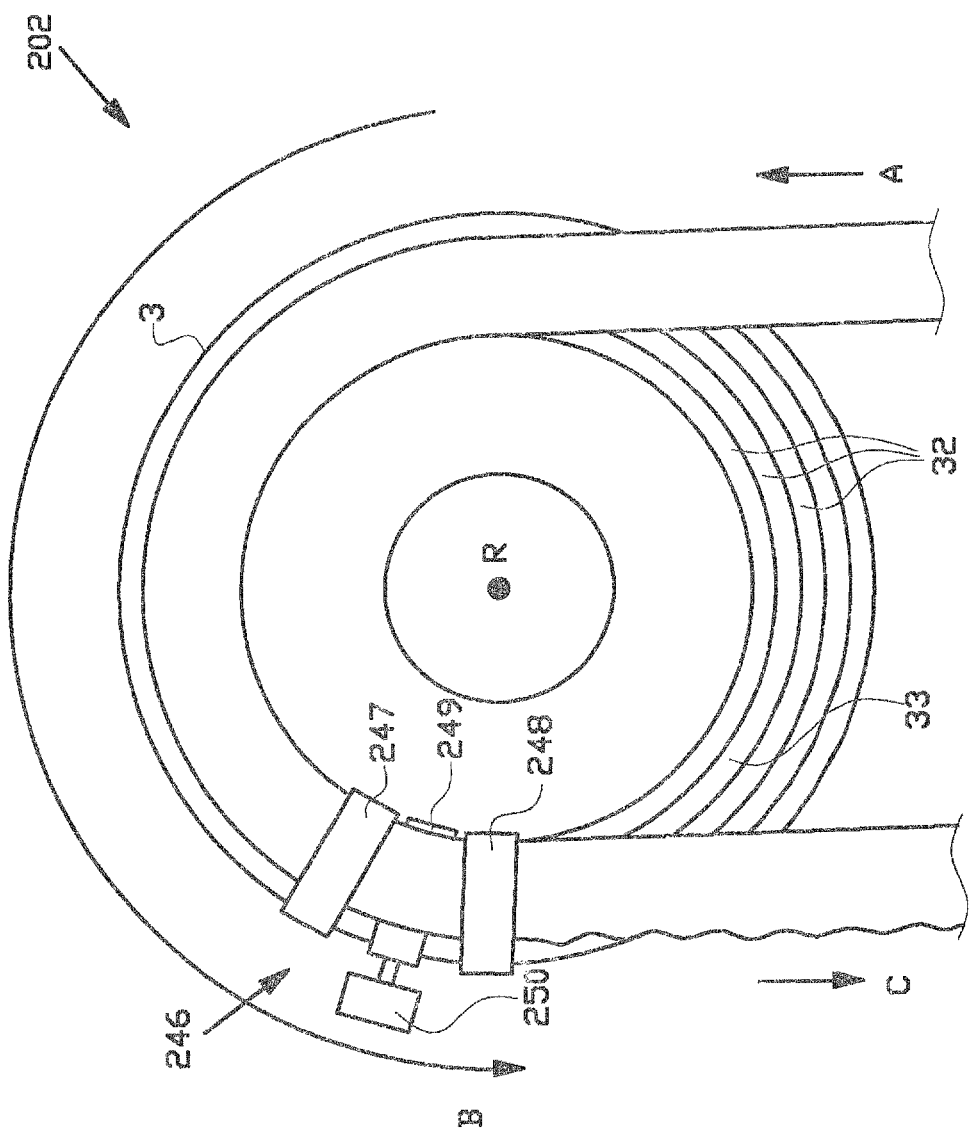

STRETCHING DEVICE FOR AN APEX FILLER STRIP FOR TIRE BEADS AND APEX HANDLING SYSTEM COMPRISING THE STRETCHING DEVICE

BACKGROUND

The invention relates to a stretching device for stretching an apex filler strip prior to application to a bead and an apex handling system comprising said stretching device.

DE 28 03 460 A1 discloses a drum with a plurality of pressure rollers for guiding a profile strip in a loop around the drum. The profile strip is supported on the drum with in a substantially parallel orientation to the rotation axis of the drum, in which the tip of the profile strip is not located radially outside the base portion thereof. Also, the profile strip is maintained constantly in said parallel orientation at a constant angle to the rotation axis of the drum directly prior to, during and directly after the loop. Stretching of the tip of the profile strip does therefore not occur.

WO 00/23262 A1 discloses an apparatus for forming an elastomeric extrusion into a bead apex filler and for applying the same to an annular bead to form a bead/apex subassembly for use in the construction of a pneumatic tire. The apex filler is formed from a triangular shaped extrusion that is wrapped around a rotating mandrel in an upright position with the tip of the apex filler extending radially outward. A helical former disposed around the mandrel on the outside of the apex filler forces the apex filler to move in a helical path as it traverses the mandrel with a constant orientation with respect to the rotation axis of the mandrel. The radially outer tip travels a longer circumference than the base portion of the apex filler, and is stretched as a result thereof. The extrusion is cooled while on the mandrel to cure the elastomeric material of the apex filler. As the extrusion is removed from the mandrel, the extrusion is relieved of compressive or tensile stresses. Then, the apex filler is wrapped around the outer periphery of the bead to form a bead/apex filler subassembly. The rotating mandrel consumes a lot of space on the factory floor. Furthermore, as the extrusion is forced into a helical path right after extrusion, it is no longer possible to linearly transport the apex filler, e.g. in a festooner, without again introducing stresses into the apex filler.

U.S. Pat. No. 5,100,497 A discloses an apparatus for forming an apex filler without the introduction of stresses at the outer edge of the apex filler. The elastomeric strip is supplied to a chuck in an upright position, with the tip of the apex filler at a radially outer position with respect to the chuck. A pair of opposed, forming rollers present a nip which is arranged to frictionally engage the elastomeric strip at the tip. The interaction between the elastomeric strip and the nip effects rotary motion of the elastomeric strip and increases the circumferential length of the elastomeric strip proportionally to the radial distance outwardly from the base thereof. An apex filler applying apparatus subsequently applies the apex filler onto the radially outer surface of a bead ring sub-assembly arranged on the chuck. It is observed that, in practice, the frictional elongation at the nip between the forming rollers may not be sufficient to achieve the required elongation.

It is an object of the present invention to provide an alternative stretching device for stretching an apex filler strip prior to application to a bead and an alternative apex handling system comprising said stretching device.

SUMMARY OF THE INVENTION

According to a first aspect, the invention provides a stretching device for stretching an apex filler strip prior to application to a bead for a tire, wherein the apex filler strip, in cross section, is provided with a base portion, a tip, a tapering portion extending from the base portion to the tip and two sides defined by the tapering portion, wherein the stretching device comprises a stretching roller that is rotatable about a rotation axis and a plurality of guides for guiding the apex filler strip in a loop around a part of the circumference of the stretching roller, wherein the stretching roller is provided with a circumferential profile that is arranged for supporting the apex filler strip in the loop at one of its two sides in a stretching orientation with the one side under a support angle with respect to the rotation axis of the stretching roller and with its tip radially outside of the base portion with respect to the rotation axis of the stretching roller for stretching said tip, wherein the plurality of guides is arranged for receiving the apex filler strip in an entry orientation towards the stretching roller and for discharging the apex filler strip in an exit orientation away from the stretching roller, wherein the plurality of guide rollers is arranged for guiding the one side of the apex filler strip in the entry orientation and the exit orientation under angles different from the support angle with respect to rotation axis of the stretching roller such that the apex filler strip is twisted in the transition from the entry orientation to the stretching orientation and in the transition from the stretching orientation to the exit orientation over a twisting angle of at least forty-five degrees.

According to a second, unclaimed embodiment, the invention provides a stretching device for stretching an apex filler strip prior to application to a bead for a tire, wherein the apex filler strip, in cross section, is provided with a base portion, a tip, a tapering portion extending from the base portion to the tip and two sides defined by the tapering portion, wherein the stretching device comprises a stretching roller that is rotatable about a rotation axis and a plurality of guides for guiding the apex filler strip in a loop around a part of the circumference of the stretching roller, wherein the stretching roller is provided with a circumferential profile that is arranged for supporting the apex filler strip in the loop at one of its two sides in a stretching orientation with the one side under a support angle with respect to the rotation axis of the stretching roller and with its tip radially outside of the base portion with respect to the rotation axis of the stretching roller, wherein the plurality of guides is arranged for receiving the apex filler strip in an entry orientation into the stretching device and for discharging the apex filler strip in an exit orientation out of the stretching device with the one side of the apex filler strip under different angles with respect to rotation axis of the stretching roller compared to the support angle in the stretching orientation, wherein the stretching device is arranged for twisting the apex filler strip in the transition from the entry orientation to the stretching orientation and in the transition from the stretching orientation to the exit orientation.

In both aforementioned embodiments, the radially outside tip of the apex filler strip has to travel a longer circumference than the radially inner base portion, the difference between the circumferences stretches the tip with respect to the base portion. The apex filler strip is temporarily twisted from the entry orientation into the stretching orientation at the stretching roller and back into the exit orientation, The stretching can thus be performed in-line between other devices of an apex handling assembly requiring the respective entry and exit orientations, e.g. between a festooner and an apex applicator.

In an embodiment the support angle is at least fifty degrees, preferably at least sixty degrees and most preferably at least seventy degrees. The higher the support angle, the greater the radial distance between the base portion and the tip. Thus, with a higher support angle, the tip can be stretched more with respect to the base portion.

In an embodiment the apex filler strip is arranged to be twisted in both transitions over a twisting angle of at least forty-five degrees, preferably at least fifty-five degrees and most preferably at least sixty-five degrees. Thus, the apex filler strip can enter and exit the stretching device in a substantially different orientation with respect to the stretching orientation, thereby accommodating in-line placement of said stretching device between other devices of an apex handling assembly requiring said respective entry and exit orientations, e.g. between a festooner and an apex applicator.

In an embodiment one of the sides of the apex filler strip, preferably the other of the two sides, in the entry orientation and the exit orientation, extends substantially parallel to the rotation axis of the stretching roller. This may correspond to the orientation required by the aforementioned other devices of the apex handling system upstream and downstream of the stretching device.

In an embodiment the stretching device is arranged for receiving the apex filler strip in an entry direction and for discharging the apex filler strip in an exit direction, wherein the entry direction and the exit direction are radially on the same side of the stretching roller, wherein stretching roller is arranged for receiving the apex filler strip in a loop around its circumference between the entry direction and the exit direction. In particular, the stretching roller is arranged for supporting the one side of the apex filler strip on the circumferential profile over an angular segment of the circumferential profile in the range of one-hundred-and-eighty to two-hundred-and-seventy degrees of its circumference. The stretching can be effectuated within the loop, so that entry to and exit from the stretching device can be realized at the same side of the stretching roller.

In an embodiment the plurality of guides comprises an entry guide for guiding the entry of the apex filler strip into the stretching device in the entry orientation. In particular, the entry guide comprises an entry roller, preferably a straight cylindrical or crowned entry roller, with a rotation axis extending substantially parallel to the rotation axis of the stretching roller. The entry guide can ensure the entry orientation of the apex filler strip or impose the entry orientation onto the apex filler strip.

In an embodiment the plurality of guides comprises a first twist guide for guiding the twisting of the apex filler strip between the entry orientation and the stretching orientation. The first twist guide is preferably arranged between the entry guide and the stretching roller. In particular, the first twist guide comprises a first twist roller, preferably a straight cylindrical or crowned first twist roller, with a rotation axis extending substantially transverse or perpendicular to the rotation axis of the stretching roller. The first twist guide can prepare or guide the transition of the apex filler strip from the entry orientation to the stretching orientation. In an embodiment the plurality of guides comprises an exit guide for guiding the exit of the apex filler strip out of the stretching device in the exit orientation. In particular, the exit guide comprises an exit roller, preferably a straight cylindrical or crowned exit roller, with a rotation axis extending substantially parallel to the rotation axis of the stretching roller. The exit guide can ensure the exit orientation of the apex filler strip or impose the exit orientation onto the apex filler strip.

In an embodiment the plurality of guides comprises a second twist guide for guiding the twisting of the apex filler strip between the stretching orientation and the exit orientation. Preferably, the second twist guide is arranged between the exit guide and the stretching roller. In particular, the second twist guide comprises a second twist roller, preferably a straight cylindrical or crowned second twist roller, with a rotation axis extending substantially transverse or perpendicular to the rotation axis of the stretching roller. The second twist guide can prepare or guide the transition of the apex filler strip from the stretching orientation to the exit orientation.

In an embodiment the rotation axes of the first twist guide and the second twist guide are parallel or collinear. The twist guides can thus be placed on the same side of the stretching roller, in particular in a symmetrical configuration.

In an embodiment the plurality of guides comprises a base portion guide for guiding the base portion into the circumferential profile of the stretching roller. Preferably, the base portion guide comprises a base portion roller with a rotation axis extending substantially transverse or perpendicular to the rotation axis of the stretching roller. The base portion guide can prevent that the apex filler strip, at the base portion thereof, does not completely enter the circumferential profile.

In an embodiment the circumferential profile comprises a tapering portion support section arranged for supporting the tapering portion at the one side thereof and/or a base portion support section arranged for supporting the base portion of the apex filler strip in a fixed axial position with respect to the rotation axis of the stretching roller. The sections can be specifically adapted for the purpose of optimally supporting the apex filler strip.

In an embodiment the circumferential profile comprises a rim for fixing the axial position of the base portion at the side thereof facing away from the tapering portion. The rim can prevent that the base portion moves in the axial direction.

In an embodiment the stretching roller comprises a plurality of discs with different diameters which are arranged to be concentrically mounted in successive axial positions along the rotation axis of the stretching roller, wherein each disc forms a part of the circumferential profile of the stretching roller at its respective axial position. In a preferred embodiment thereof each disc is interchangeable with another disc having a different diameter to vary the circumferential profile formed by the plurality of discs. Thus, the circumferential profile can be adapted, altered or varied to accommodate different types of apex filler strips or to change the support angle.

In an embodiment the stretching device is further provided with a heater for heating the stretching roller, at least at the circumferential profile thereof. The heat of the heated stretching roller can transferred onto the material of the apex filler strip, thereby making it easier to deform the apex filler strip. In particular at the tip, where the thickness of the material is thin, the apex filler strip can be more easily deformed with respect to the relatively thick base portion.

In an embodiment thereof in combination with the aforementioned discs, at least some of the plurality of discs are operationally coupled to and heated by the heater. Thus, the heat can be transferred via one or more of the discs.

In an embodiment the stretching device is further provided with a pressing roller for pressing the apex filler strip against the circumferential profile of the stretching roller, preferably at or near the tip of the apex filler strip. The pressing roller can further deform the apex filler strip, in particular at the tip, to further stretch the apex filler strip.

In an embodiment the stretching device is further provided with an additional stretching assembly with a first hold-down roller and a second hold-down roller arranged opposite to the circumferential profile for holding down the apex filler strip on said circumferential profile, wherein the additional stretching assembly comprises a further stretch roller in between the hold-down rollers, wherein the further stretch roller is arranged for receiving the part of the apex filler strip between the hold-down rollers in a loop around its circumference, wherein the further stretch roller is arranged to further stretch the tip of apex filler strip. Thus, the stretching of the tip can be increased without changing the configuration of the stretch roller and/or the circumferential profile of said stretch roller.

In an embodiment thereof the further stretch roller is adjustable such that its rotation axis can be set to an angle that is opposite to the support angle of the circumferential profile. The adjustable further stretch roller can thus provide instant, real time or 'on the fly' fine adjustments of the stretching of the tip of the apex filler strip, prior to the apex filler strip leaving the stretch roller.

In a further embodiment thereof the stretching assembly is arranged at the side of the stretching roller at or near the location where the apex filler strip is arranged to leave the circumferential profile in the exit direction. This location is preferred as it can reduce waving in the tip during its loop around the circumferential profile. The tip will only start waving after the stretching assembly.

In a preferred embodiment the one side is the side of the apex filler strip that is arranged to face axially inwards when applied to the bead in a tire.

According to a third aspect, the invention provides an apex handling system comprising the aforementioned stretching device and further comprising a festooner with a plurality of upper rollers and lower rollers rotatable about a plurality of respective rotation axes, wherein the festooner is arranged for discharging the apex filler strip into the stretching device in the entry orientation. The stretching can thus be performed in-line downstream of the festooner with the festooner supplying the apex filler strip already in the required entry orientation.

In an embodiment the plurality of upper rollers and lower rollers each have rotation axes which are substantially parallel to the rotation axis of the stretching roller. The rollers of the festooner can thus be used to buffer the apex filler strip while the apex filler strip substantially remains in the entry orientation throughout the festooner.

In an embodiment the stretching device is placed in line with the festooner to form a continuation of said festooner, wherein the festooner ends with a lower roller upstream of the stretching device, wherein the stretching roller acts as a further upper roller interacting with the directly upstream lower roller of the festooner. Thus, the stretching device can essentially be a part of the festooner, replacing one of the upper rollers by the stretching roller. The stretching device can thus be neatly integrated into the festooner or between the end of the festooner and the apex applicator, resulting in a compact, simple stretching device.

In an embodiment the apex handling system further comprises an apex applicator for applying the apex filler strip to the bead, wherein the apex applicator comprises a conveyor for receiving the apex filler strip from the stretching device in the exit orientation. The stretching can thus be performed in-line upstream of the apex applicator with the stretching device discharging the apex filler strip already in the required exit orientation for subsequent processing in the apex applicator.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIGS. 9A, 9B and 9C show a front view, a side view and a top view, respectively, of a further alternative stretching device according to a third embodiment of the invention.

DETAILED DESCRIPTION OF THE INVENTION

Figure 1:
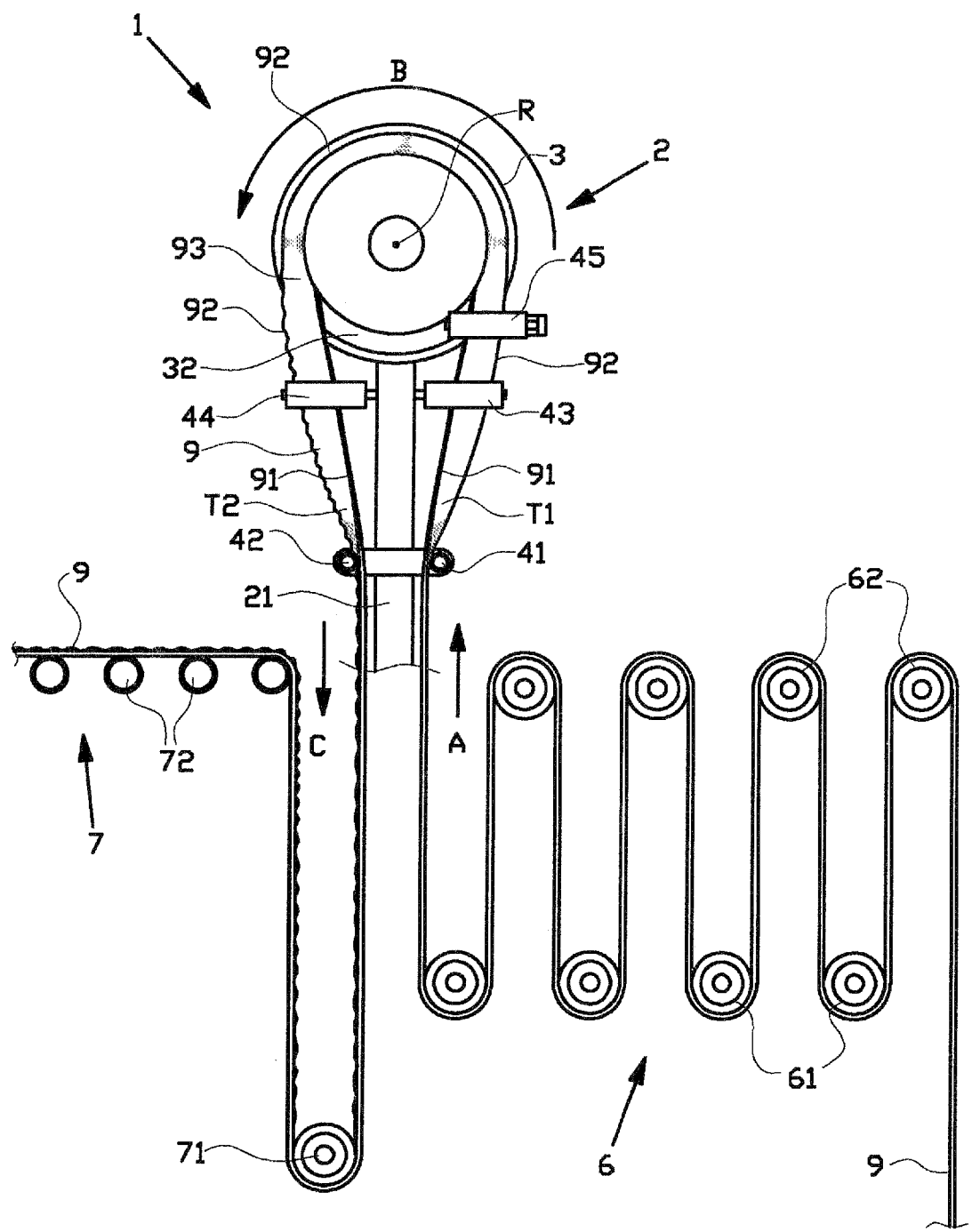
FIG. 1 shows a front view of an apex handling system with a stretching device according to a first embodiment of the invention.

FIG. 1 shows an apex handling system 1 according to a first embodiment of the invention, for handling an apex, apex strip or apex filler strip 9 that is ultimately applied to an annular bead (not shown) to form a bead-apex assembly for use in subsequent manufacturing stages of a vehicle tire. As shown in cross section in FIG. 6, the apex filler strip 9 is provided with a base portion 91, a tip 92, and a tapering portion 93 extending from the base portion 91 to the tip 92. The tapering portion 93 defines a first side 94 and a second side 95 which are arranged to face axially to the inside and the outside, respectively, of the tire. The tapering sides 94, 95 provide a smooth transition between the bead and the tire layers on the axial outside of the tire with respect to the bead and the tire layers on the axial inside of the tire with respect to the bead, respectively.

The apex handling system 1 is provided with a stretching device 2 for stretching the apex filler strip 9 in a manner that will be described in more detail hereafter, an apex supply device 6 for supplying the apex filler strip 9 in an entry direction A to the stretching device 2 and an apex applicator 7 for receiving the apex filler strip 9 from the stretching device 2 in a discharge or exit direction C, for subsequent application to the bead (not shown). The stretching device 2 is arranged in an intermediate position or 'in-line' between the apex supply device 6 and the apex applicator 7. The stretching device 2 can be seen as forming an extension to the apex supply device 6.

The apex supply device 6 comprises a festooner with a plurality of lower rollers 61 and upper rollers 62 which are rotatable about a plurality of respective, mutually parallel rotation axes. The apex filler strip 9 is linearly transported between the rollers 61, 62 in a manner known per se, with its first side 94 and second side 95 alternating in a parallel orientation with each subsequent rollers 61, 62. The apex filler strip 9 is ultimately discharged from the last lower roller 61 directly upstream of the stretching device 2 into the stretching device 2 in the entry direction A.

The apex applicator 7 comprises a lower roller or dancer roll 71 and a roller conveyor 72, wherein the dancer roller 71 and the rollers of the roller conveyor 72 have respective, mutually parallel rotation axes. The apex filler strip 9 is discharged from the stretching device 2 in the exit direction C and subsequently looped around the dancer roller 71 towards the roller conveyor 72. The dancer roller is movable in the vertical direction to control the length or speed of the apex filler strip 9 being fed into the roller conveyor 72, in a manner known per se.

Figure 2:
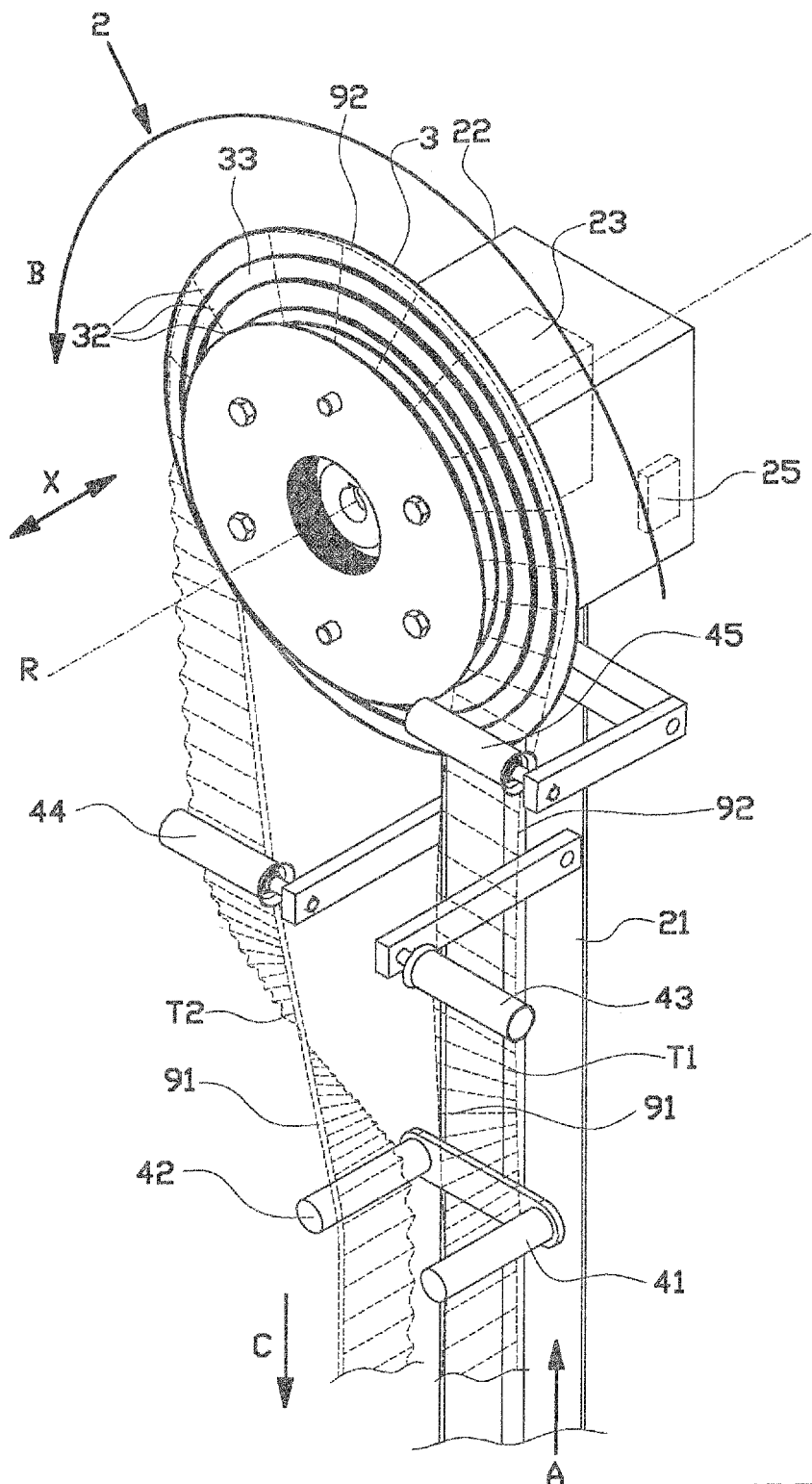
FIG. 2 shows an isometric view of the stretching device according to FIG. 1.

As shown in FIG. 1, the stretching device 2 comprises a mount 21 for supporting the stretching device 2 in its 'in-line' position between the apex supply device 6 and the apex applicator 7. As best seen in FIG. 2, the stretching device 2 is further provided with a housing 22 that houses a drive 23 and a drive shaft 24 extending in an axial direction X from the drive 23 and defining a rotation axis R. The stretching device 2 optionally comprises a heater 25.

Figure 7:
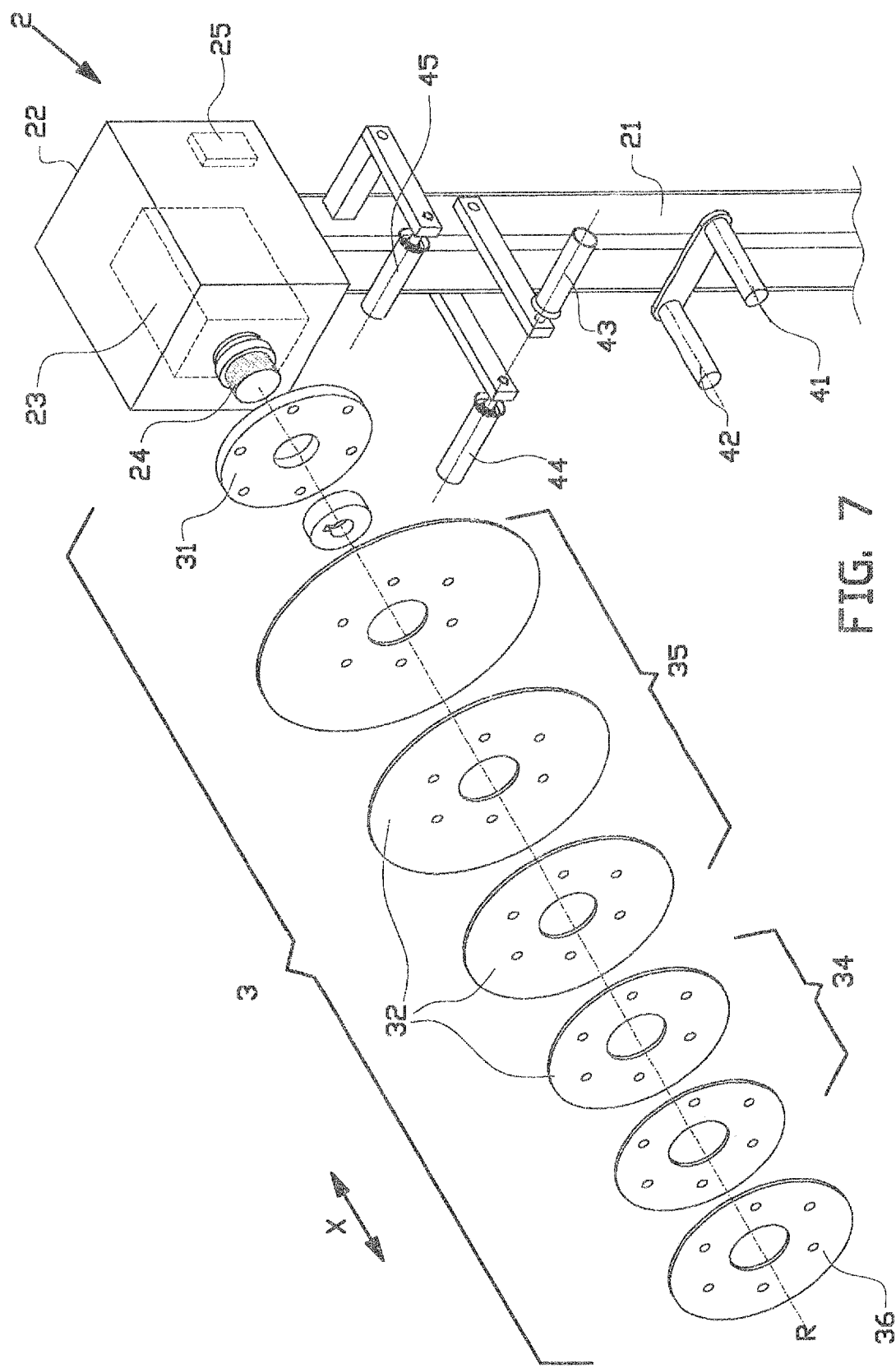
FIG. 7 shows an exploded view of the stretching device according to FIG. 2.

As shown in FIGS. 2 and 7, the stretching device comprises a stretching roller 3 that is rotationally mounted to the drive 23 for driven rotation about the rotation axis R. The stretching roller 3 acts as a further upper roller of the apex supply device 6 in that it receives the apex filler strip 9 from the lower roller 61 of the apex supply device 6 in the entry direction A, supports the apex filler strip 9 in a loop B along at least a part of its circumference and subsequently discharges the apex filler strip 9 in the exit direction C towards the apex applicator 7. The loop B is such that both the entry direction A and the exit direction C are on the same side, radially, of the stretching roller 3. The exiting length of the apex filler strip 9 is thus doubled back with respect to the entering length of the apex filler strip 9.

During the loop B around the stretching roller 3, the apex filler strip 9 is supported in a stretching orientation in which the tip 92 of the apex filler strip 9 is radially outside of the base portion 91 with respect to the rotation axis R. The radially outer tip 92 travels a larger and thus longer circumference with respect to the radially inner base portion 91, wherein the difference between the two circumferences stretches the tip 92.

Figure 6:
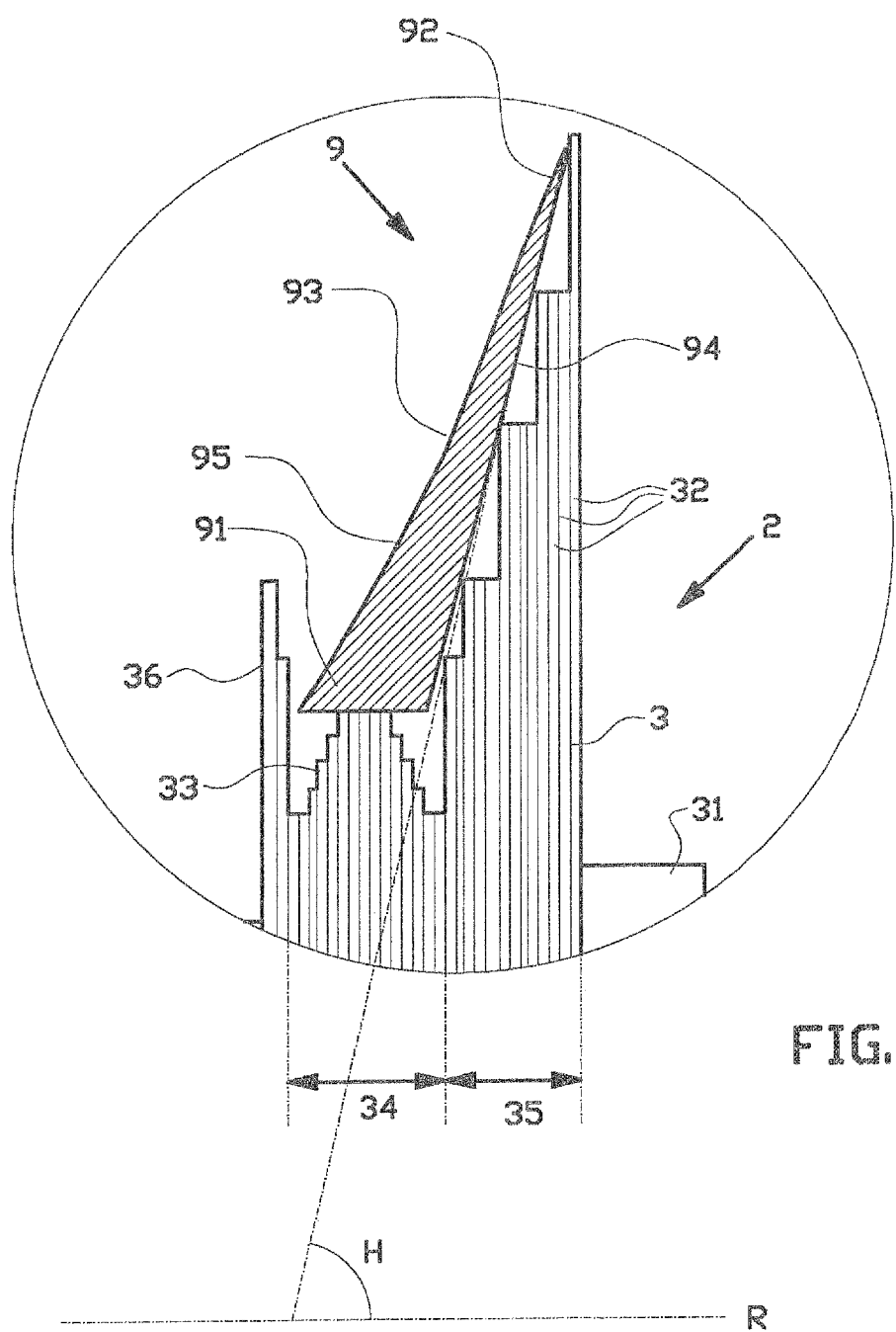
FIG. 6 shows a detail of the stretching device according to the circle VI in FIG. 4.

The stretching roller 3 is provided with a mounting ring 31 and a plurality of discs 32 mounted as a package or a set to the mounting ring 31 with a plurality of fasteners. The mounting ring 31 is rotation-fixedly coupled to the drive shaft 24 for rotation with the drive shaft 24 about the rotation axis R. The discs 32 are arranged to be concentrically mounted on the mounting ring 31 and—as such—are also rotatable about the same rotation axis R. The discs 32 are mounted face to face in the axial direction X in successive axial positions along the rotation axis R of the stretching roller 3. The discs 32 have a plurality of different diameters. As best seen in FIG. 6, each disc 32 of the plurality of discs 32, when mounted, forms a part of a circumferential contour, shape or profile 33 of the stretching roller 3 at its respective axial position. Each disc 32 is interchangeable with another disc 32 (e.g. from the same set or a different set) having a different diameter to adapt, alter or vary the circumferential profile 33 formed by the plurality of discs 32. In FIG. 7, the number of discs 32 has been reduced to simplify the drawing. However, the number of discs 32, as shown in the detail of FIG. 6, will be substantially higher, e.g. more than twenty.

The circumferential profile 33 is arranged to optimally support the apex filler strip 9 at its cross section in the stretching orientation. The apex filler strip is supported along a limited angular segment of the circumference of the stretching roller 3. In this exemplary embodiment, the angular segment is limited to less than a full revolution, in particular in the range of one-hundred-and-eighty to two-hundred-and-seventy degrees.

The circumferential profile 33 comprises a base portion support section 34 for supporting the base portion 91 of the apex filler strip 9 and a tapering portion support section 35 for supporting one of the sides 94, 95 of the apex filler strip 9 under a support angle H of at least fifty degrees, preferably at least sixty degrees and most preferably at least seventy degrees with respect to the axial direction X and the rotation axis R. The support angle H can be varied by changing the configuration of the plurality of discs 32. E.g., a steep support angle H can be achieved by choosing discs 32 with a small diameter at the base portion support section 34 and/or choosing discs 32 with a large diameter at the tapering portion support section 35. In this example, the tapering portion support section 35 is arranged for supporting the first side 94 of the apex filler strip 9. At least one of the plurality of discs 32 is arranged to extend in the axial direction X on the outside of the apex filler strip 9 at the side of the base portion 91, in particular at the side of the base portion 91 facing away from the tapering portion 93. Said at least one of the discs 32 forms a rim section or rim 36 for fixing the axial position of the base portion 91 in the axial direction X.

As shown in FIGS. 2-5, the stretching device 2 further comprises an entry guide 41 for guiding the entry of the apex filler strip 9 in the entry direction A from the apex supply device 6 into the stretching device 2. The entry guide 41 comprises an entry roller with a rotation axis extending substantially parallel to the rotation axis R of the stretching roller 3. The entry guide 41 guides the apex filler strip 9 at or near the entry guide 41 into an entry orientation, in which one of its sides 94, 95, in this example the second side 95, extends parallel or substantially parallel to the rotation axis R. It is noted that, in this example, the entry orientation is similar to the orientation in which the apex filler strip 9 is supplied to the stretching device 2 in the entry direction A by the apex supply device 6. In particular, the rotation axis of the entry guide 41 is parallel to the respective rotation axes of the rollers 61, 62 of the apex supply device 6.

The stretching device 2 further comprises an exit guide 42 for guiding the exit of the apex filler strip 9 in the exit direction C from the stretching device 2 towards the apex applicator 7. The exit guide 42 comprises an exit roller with a rotation axis extending substantially parallel to the rotation axis R of the stretching roller 3 and to the rotation axis of the entry roller. The exit guide 42 guides the apex filler strip 9 at or near the exit guide 42 into an exit orientation, in which one of its sides 94, 95, in this example the second side 95, extends parallel or substantially parallel to the rotation axis R. It is noted that, in this example, the exit orientation is similar to the orientation in which the apex filler strip 9 is received and subsequently transported in the apex applicator 7. In particular, the rotation axis of the exit guide 42 is parallel to the respective rotation axes of the rollers 71 and the roller conveyor 72 of the apex applicator 7.

In this embodiment, the entry guide 41 and the exit guide 42 are both positioned in the radial direction of the stretching roller 3 vertically below the stretching roller 3, in particular approximately in line with the tangents of circumferential profile 33 at the ends of the angular segment of the circumferential profile 33 where the apex filler strip 9 is to be supported during the loop B.

Figure 3:
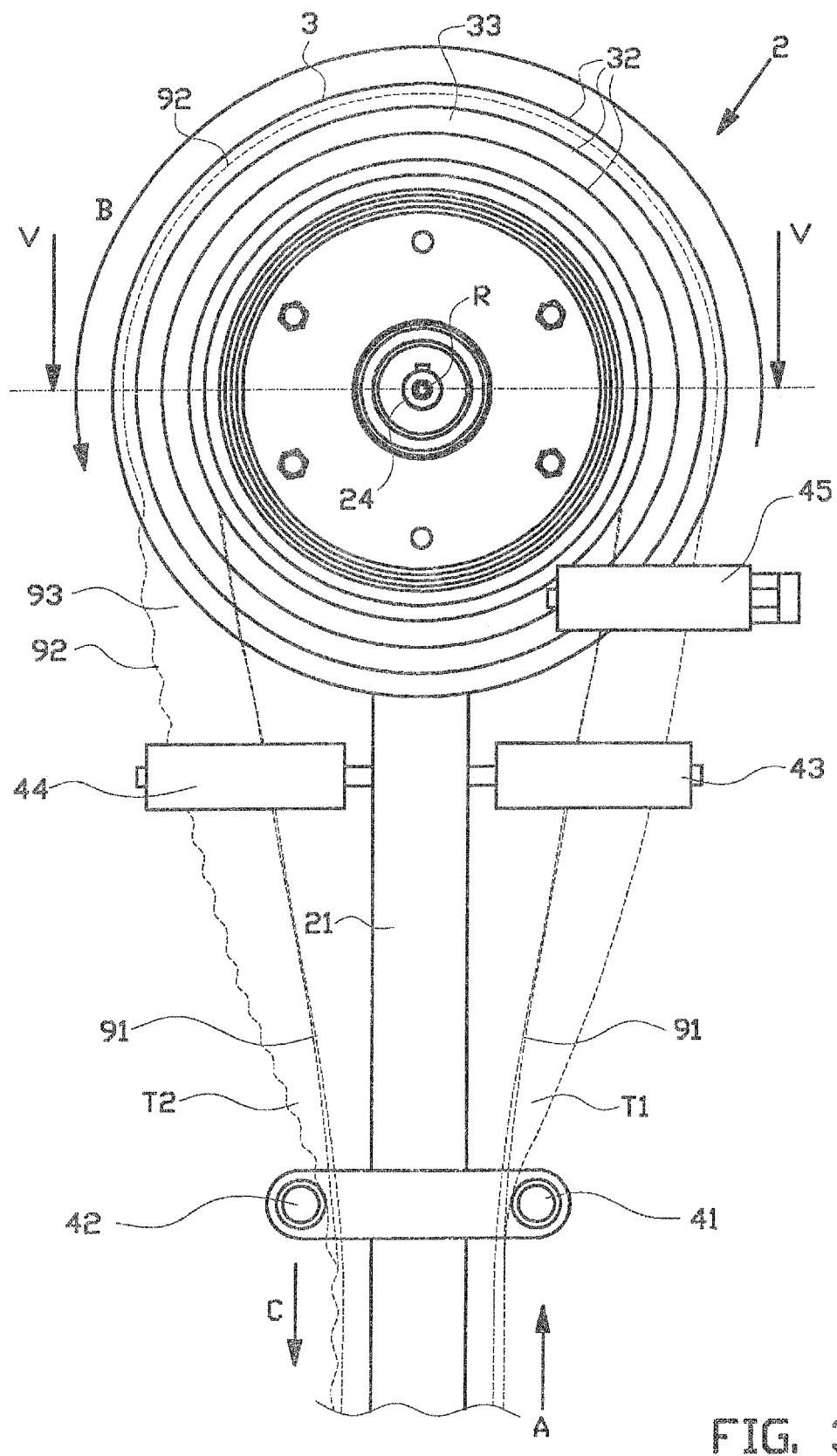
FIG. 3 show a front view of the stretching device according to FIG. 2.

Thus, the apex filler strip 9 is supplied to or entered into the stretching device 2 in the entry direction A in the entry orientation with one of its sides 94, 95 parallel to the rotation axis R of the stretching roller 3. The apex filler strip 9 is then twisted in a first transition T1 between the entry guide 41 and the stretching roller 3 from the entry orientation into the stretching orientation. The apex filler strip 9 is subsequently stretched at its tip 92 during the support on the stretching roller 3 and then twists again in a second transition T2 from the stretching orientation towards the exit orientation as it leaves the stretching roller 3 towards the exit guide 42. The apex filler strip 9 exits or is discharged from the stretching device 2 in the exit direction C in said exit orientation. The term 'twisting' in the context of the present application means that the apex filler strip 9 is rotated, warped and/or inverted about its longitudinal direction, axis or center line. In FIG. 3, dashed reference lines are provided to help visualize the twisting occurring in the apex filler strip 9 in the transitions T1, T2, and the stretching occurring in the apex filler strip 9 during the loop B. As the apex filler strip 9 is transported in the exit direction C along a substantially linear path, the stretched tip 92 of the apex filler 9 will tend to wave as its length is considerably longer than the length of the base portion 91.

The angle of the twisting in the apex filler strip 9 in the transitions T1, T2 is equal to the support angle H minus the angle between the first side 94 and the second side 95. Preferably, the twisting angle is at least forty-five degrees, more preferably at least fifty-five degrees and most preferably at least sixty-five degrees. Due to the steep support angle H of more than fifty degrees, the apex filler strip 9 can be considered to be turned upright with respect to the rotation axis R towards a plane normal to the rotation axis R of the stretching roller 3. The stretching of the tip 91 thus mainly occurs in the circumferential direction of the stretching roller 3 in or parallel to said normal plane.

As shown in FIGS. 2-5, the stretching device 2 is additionally provided with a first twist guide 43 between the entry guide 41 and the stretching roller 3 for guiding the twisting of the apex filler strip 9 in the first transition T1 between the entry orientation at the entry guide 41 and the stretching orientation at the stretching roller 3. The first twist guide 43 comprises a first twist roller with a rotation axis extending substantially transverse or perpendicular to the rotation axis R of the stretching roller 3. The stretching device 2 also comprises a second twist guide 44 for guiding the twisting of the apex filler strip 9 in the second transition T2 between the stretching orientation and the exit orientation. The second twist guide 44 comprises a second twist roller with a rotation axis extending substantially transverse or perpendicular to the rotation axis of the stretching roller. In this exemplary embodiment, the first twist guide 43 and the second twist guide 44 are arranged such that their rotation axes are parallel or collinear.

The plurality of guide rollers 41-44 are arranged for guiding the supported side 94 of the apex filler strip 9 in the entry orientation and the exit orientation under angles different from the support angle H with respect to rotation axis R of the stretching roller 3. The angles in subsequently the entry orientation, the support orientation and the exit orientation are different when viewed in the direction of transport or motion of the apex filler strip 9.

Finally, the stretching device 2 comprises a base portion guide 45 for guiding the base portion 91 into the circumferential profile 33 of the stretching roller 3. In particular, the base portion guide 45 is arranged right next to the rim 36 of the circumferential profile 33 and ensures that the base portion 91 is forced or guided into the base portion support section 34 in the axial direction X behind the rim 36. The base portion guide 45 is arranged only at the upstream side of the stretching roller 3 with respect to the entry direction A. Once the base portion 91 is forced into the base portion support section 34, it is unlikely that it is pulled out of the circumferential profile 33 before the end of the angular segment over which the apex filler strip 9 is to be supported. The base portion guide 45 comprises a base portion roller with a rotation axis extending substantially transverse or perpendicular to the rotation axis R of the stretching roller 3.

The rollers of the entry guide 41, the exit guide 42, the first twist guide 43, the second twist guide 44 and the base portion guide 45 are depicted as straight cylindrical rollers. Alternatively, the rollers can also have a varying diameter, e.g. like crowned rollers.

Figure 4:
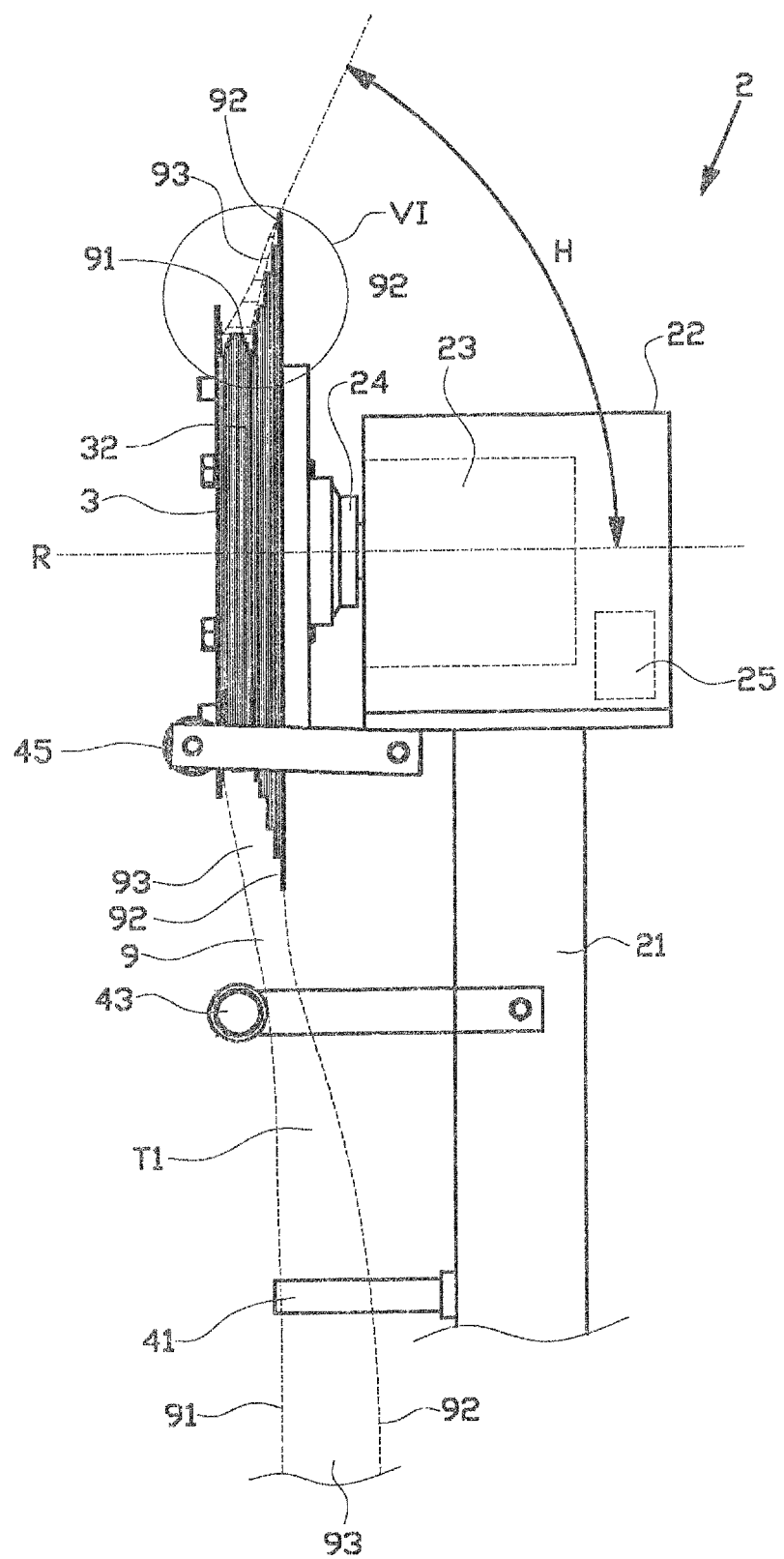
FIG. 4 shows a side view of the stretching device according to FIG. 2.
Figure 5:
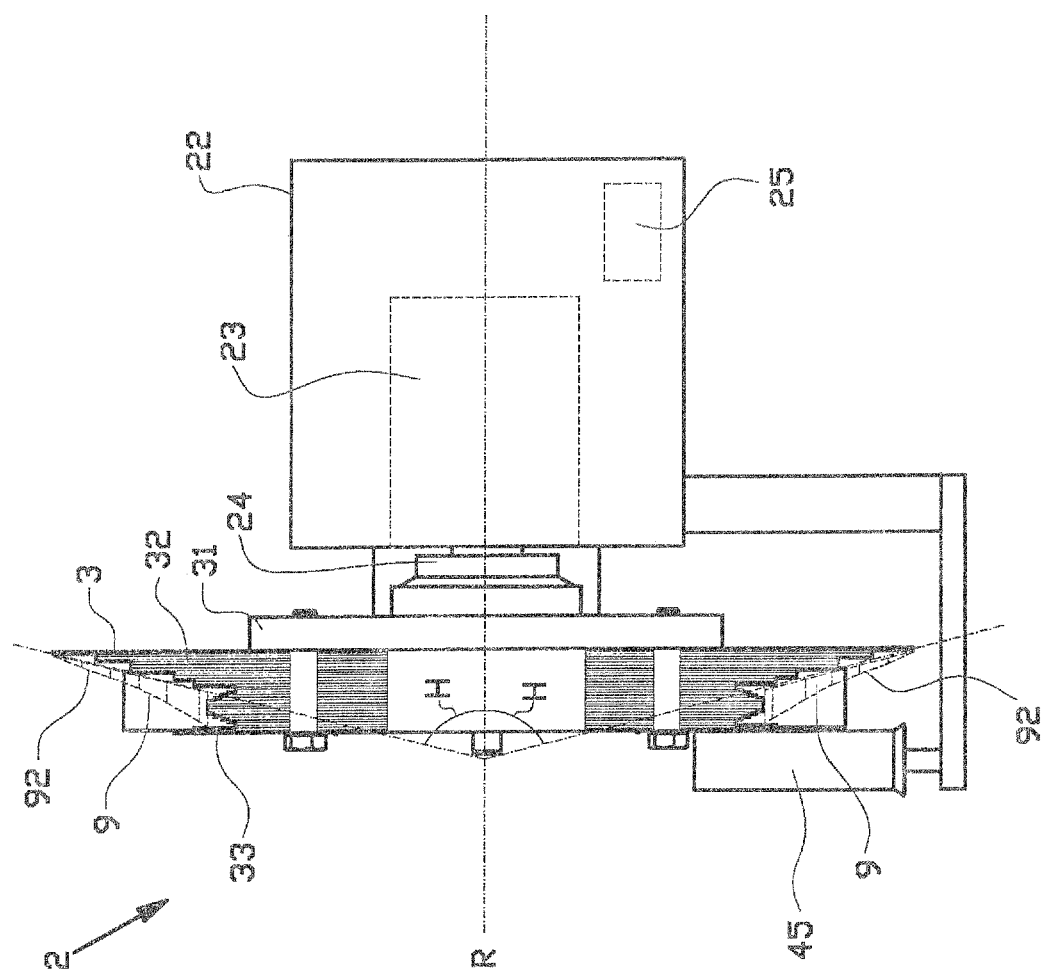
FIG. 5 shows a top view in cross section according to the line V-V in FIG. 3.

The optional heater, as shown in FIGS. 2, 4 and 5 is arranged to be thermally coupled to one or more discs 32 of the plurality of discs 32 for heating up said one or more discs 32. The heat from the heated discs 32 is transferred onto the material of the apex filler strip 9 supported on said discs 32, which allows for easier deformation of the apex filler strip 9. In particular, it is observed that the material of the apex filler strip 9 is thinner towards the tip 92, which is thus more likely to heat up to a higher temperature than the relatively thick base portion 91, thereby creating a temperature difference that makes it easier to deform the tip 92.

Figure 8:
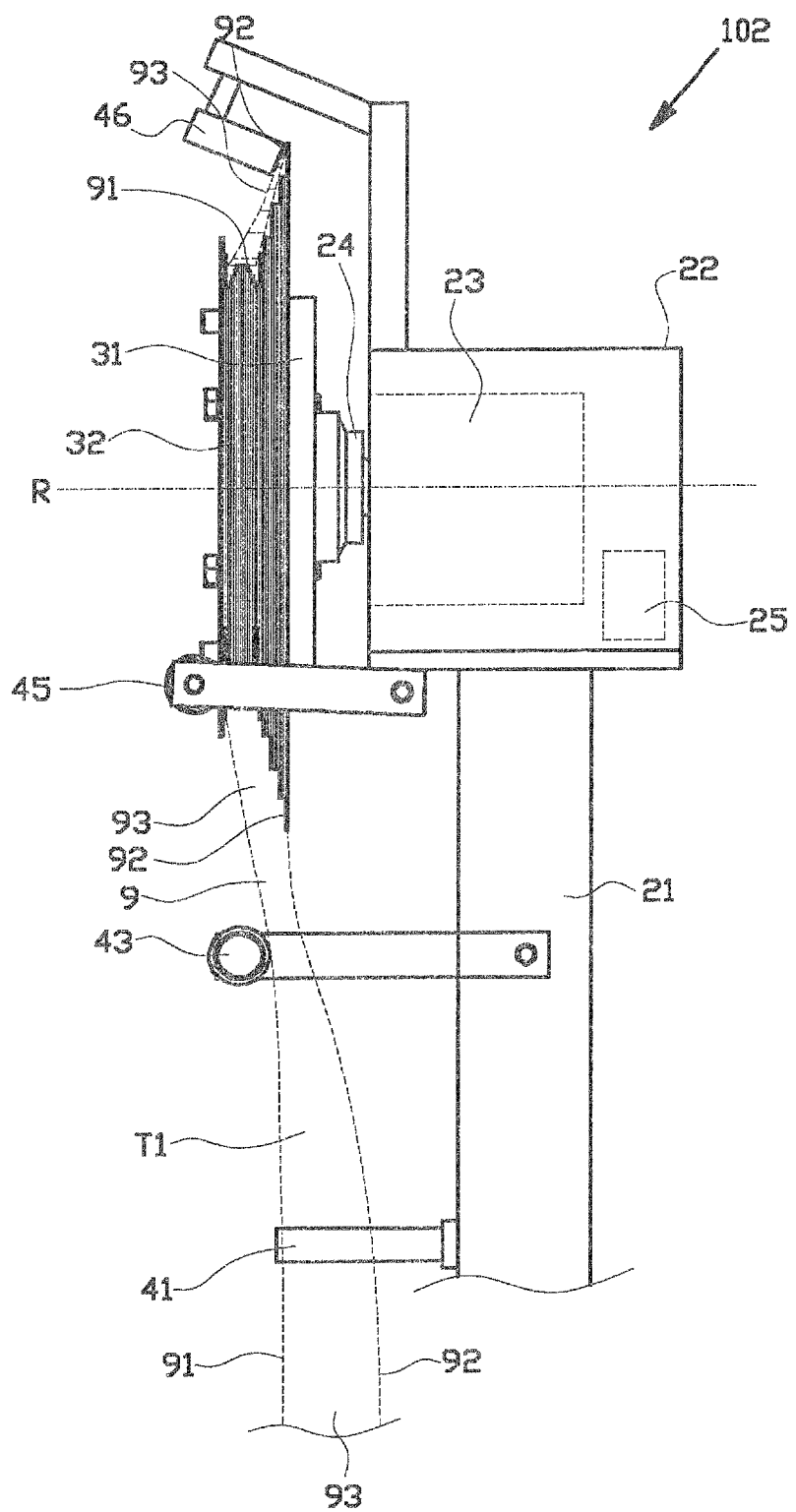
FIG. 8 shows a side view of an alternative stretching device according to a second embodiment of the invention.

FIG. 8 shows an alternative stretching device 102 according to a second embodiment of the invention. The alternative stretching device 102 is substantially the same as the stretching device 2 according to FIGS. 1-7, apart from the presence of a pressing roller 46 arranged at the top of the stretching roller 3, for pressing the apex filler strip 9 against the circumferential profile 33 of the stretching roller 3. The pressing roller 46 is arranged for pressing the apex filler strip 9 at or near the tip 92, thereby further generating elongation or deformation of the material of the apex filler strip 9 at the tip 92 as a result of the friction. The pressing roller 46 thus further increases the amount of stretch being effectuated in the apex filler strip 9. The pressing roller 46 is depicted as a straight cylindrical roller, but can alternatively be formed as a roller with a varying diameter, e.g. as a crowned roller, or as a toothed roller.

Figure 9C:
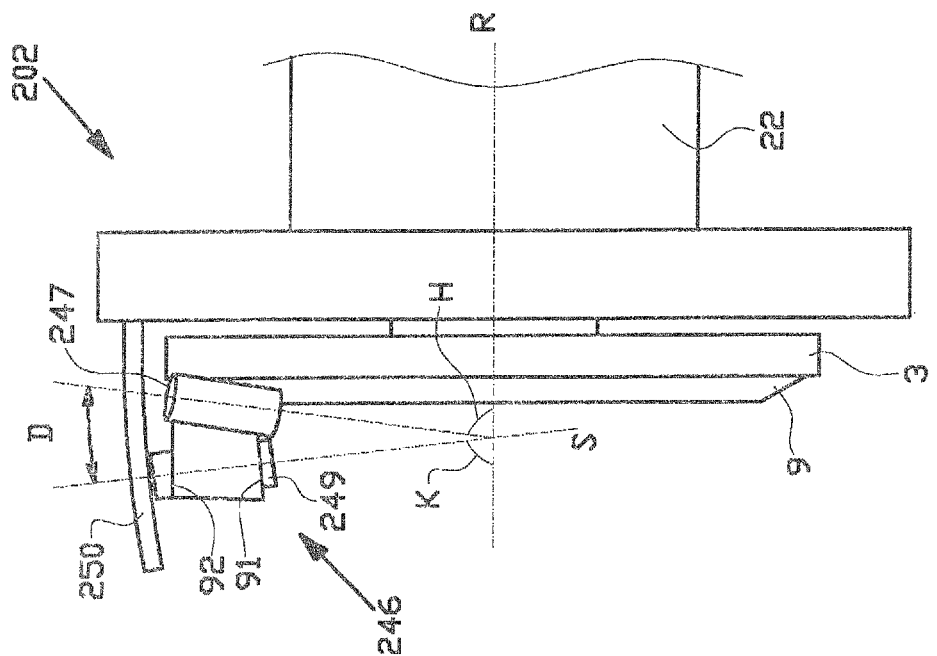
Figure 9B:
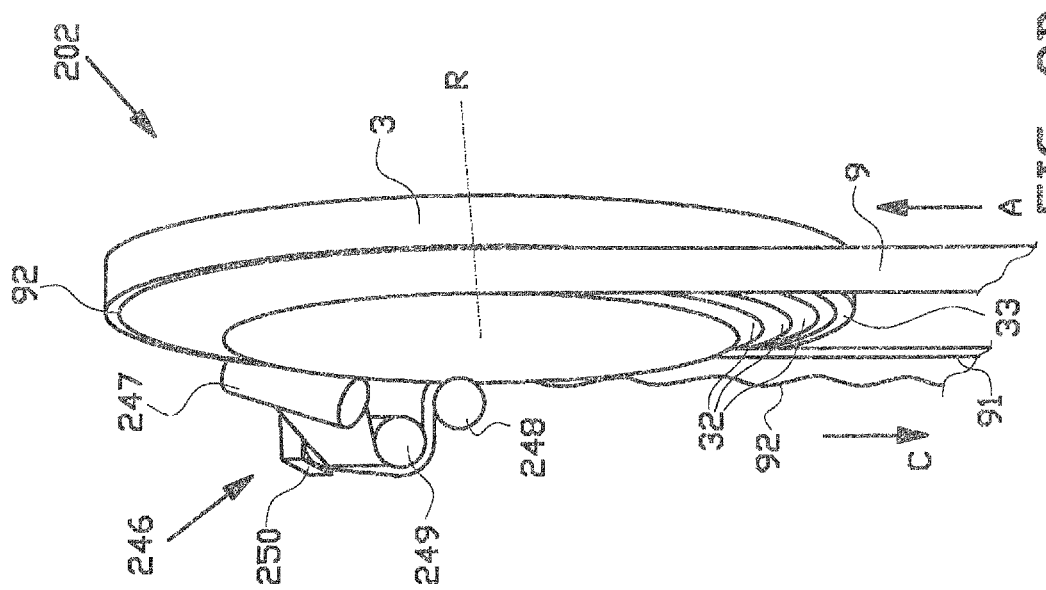

FIGS. 9A, 9B and 9C show a further alternative stretching device 202 according to a third embodiment of the invention. The further alternative stretching device 202 is substantially the same as the stretching device 2 according to FIGS. 1-7, apart from the presence of an additional stretching assembly 246. The stretching assembly 246 is arranged for additionally and adjustably stretching of the apex filler strip 9.

The stretching assembly 246 comprises a first hold-down roller 247 and a second hold-down roller 248 opposite to the circumferential profile 33. The stretching assembly 246 comprises an adjustable further stretch roller 249 in between. The adjustable further stretch roller 249 is movably mounted on a guide rail 250, coupled to the housing 22, such that the rotation axis S of the adjustable further stretch roller 249 can be set to an angle K that is opposite to the support angle H of the circumferential profile 33 with respect to the vertical plane. As the apex filler strip 9 is held down by the respective hold-down rollers 247, 248 on the circumferential profile 33 of the stretch roller 3 and the part of the apex filler strip 9 between said hold-down rollers 247, 248 is looped around the adjustable further stretch roller 249 between the hold-down rollers 247, 248, the tip 92 can be adjustably stretched additionally or further with respect to the stretching already occurring during the loop B around the circumferential profile 33. With its rotation axis S under the opposite angle K, the circumferential surface of the adjustable further stretch roller 249 mainly or forcefully abuts the tip 92 of the apex filler strip 9. The adjustable further stretch roller 249 thus allows for instant, real time or 'on the fly' fine adjustments of the stretching of the tip 92 of the apex filler strip 9, prior to the apex filler strip 9 leaving the (main or primary) stretch roller 3.

As shown in FIG. 9A, the stretching assembly 246 is arranged at the side of the (main or primary) stretching roller 3 at or near the location where the apex filler strip 9 leaves the circumferential profile 33 in the discharge or exit direction C. The stretching assembly 246 can alternatively be placed at any position in the loop B. A more upstream location in the loop B will however cause waving in the tip 92 of the apex filler strip 9 prior to the apex filler strip 9 leaving the circumferential profile 33, thereby possibly influencing the consistency of the stretching during the remaining, downstream part of the loop B. The location as shown in FIG. 9A is thus preferred.

The hold-down rollers 247, 248 and the adjustable further stretch roller 249 in FIGS. 9A, 9B and 9C are depicted as straight cylindrical rollers. Alternatively, one or more of said rollers can have a variable diameter, e.g. a conical roller or a crowned roller. The wide diameter of such an alternative conical roller is to be placed in contact with the tip 92 of the apex filler strip 9 to further increase the amount of stretching occurring in the tip 92.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary the invention relates to a stretching device for stretching an apex filler strip prior to application to a bead for a tire, wherein the stretching device comprises a stretching roller and a plurality of guides for guiding the apex filler strip in a loop around the stretching roller, wherein the plurality of guides is arranged for receiving the apex filler strip in an entry orientation and for discharging the apex filler strip in an exit orientation, wherein the plurality of guide rollers is arranged for guiding the one side of the apex filler strip in the entry orientation and the exit orientation under angles different from the support angle with respect to rotation axis of the stretching roller such that the apex filler strip is twisted over a twisting angle of at least forty-five degrees.

The invention claimed is:

1. A stretching device for stretching an apex filler strip prior to application to a bead for a tire, wherein the apex filler strip, in cross section, is provided with a base portion, a tip, a tapering portion extending from the base portion to the tip and two sides defined by the tapering portion, wherein the stretching device comprises a stretching roller that is rotatable about a rotation axis and a plurality of guides for guiding the apex filler strip in a loop around a part of the circumference of the stretching roller, wherein the stretching roller is provided with a circumferential profile that is arranged for supporting the apex filler strip in the loop at one of its two sides in a stretching orientation with the one side under a support angle with respect to the rotation axis of the stretching roller and with its tip radially outside of the base portion with respect to the rotation axis of the stretching roller for stretching said tip, wherein the plurality of guides is arranged for receiving the apex filler strip in an entry orientation towards the stretching roller and for discharging the apex filler strip in an exit orientation away from the stretching roller, wherein the plurality of guides is arranged for guiding the one side of the apex filler strip in the entry orientation and the exit orientation under angles different from the support angle with respect to rotation axis of the stretching roller such that the apex filler strip is twisted in the transition from the entry orientation to the stretching orientation and in the transition from the stretching orientation to the exit orientation, wherein the plurality of guides comprises an entry guide for guiding the entry of the apex filler strip into the stretching device in the entry orientation, wherein the entry guide comprises an entry roller with a rotation axis extending parallel to the rotation axis of the stretching roller, wherein the plurality of guides comprises a first twist guide for guiding the twisting of the apex filler strip in the transition between the entry orientation and the stretching orientation, wherein the first twist guide comprises a first twist roller with a rotation axis extending transverse or perpendicular to the rotation axis of the stretching roller, and wherein the plurality of guides comprises an exit guide for guiding the exit of the apex filler strip out of the stretching device in the exit orientation, wherein the exit guide is an exit roller.

2. The stretching device according to claim 1, wherein the support angle is at least fifty degrees, at least sixty degrees or at least seventy degrees.

3. The stretching device according to claim 1, wherein the apex filler strip is arranged to be twisted in both transitions over a twisting angle of at least fifty-five degrees or at least sixty-five degrees.

4. The stretching device according to claim 1, wherein the stretching device is arranged for receiving the apex filler strip in an entry direction and for discharging the apex filler strip in an exit direction, wherein entry to the stretching device in the entry direction and exit from the stretching device in the exit direction are realized radially on the same side of the stretching roller, wherein the stretching roller is arranged for receiving the apex filler strip in a loop around its circumference between the entry direction and the exit direction.

5. The stretching device according to claim 4, wherein the stretching roller is arranged for supporting the one side of the apex filler strip on the circumferential profile over an angular segment of the circumferential profile in the range of one-hundred-and-eighty to two-hundred-and-seventy degrees of its circumference.

6. The stretching device according to claim 1, wherein the first twist guide is arranged between the entry guide and the stretching roller.

7. The stretching device according to claim 1, wherein the exit roller has a rotation axis extending parallel to the rotation axis of the stretching roller.

8. The stretching device according to claim 1, wherein the plurality of guides comprises a second twist guide for guiding the twisting of the apex filler strip in the transition between the stretching orientation and the exit orientation.

9. The stretching device according to claim 8, wherein the exit roller has a rotation axis extending parallel to the rotation axis of the stretching roller, and wherein the second twist guide is arranged between the exit guide and the stretching roller.

10. The stretching device according to claim 8, wherein the second twist guide comprises a second twist roller with a rotation axis extending transverse or perpendicular to the rotation axis of the stretching roller.

11. The stretching device according to claim 10, and wherein the rotation axes of the first twist guide and the second twist guide are parallel or collinear.

12. The stretching device according to claim 1, wherein the plurality of guides comprises a base portion guide for guiding the base portion into the circumferential profile of the stretching roller.

13. The stretching device according to claim 12, wherein the base portion guide comprises a base portion roller with a rotation axis extending transverse or perpendicular to the rotation axis of the stretching roller.

14. The stretching device according to claim 1, wherein the circumferential profile comprises a tapering portion support section arranged for supporting the tapering portion at the one side thereof.

15. The stretching device according to claim 1, wherein the circumferential profile comprises a base portion support section arranged for supporting the base portion of the apex filler strip in a fixed axial position with respect to the rotation axis of the stretching roller.

16. The stretching device according to claim 15, wherein the circumferential profile comprises a rim for fixing the axial position of the base portion at the side thereof facing away from the tapering portion.

17. The stretching device according to claim 1, wherein the stretching roller comprises a plurality of discs with different diameters which are arranged to be concentrically mounted in successive axial positions along the rotation axis of the stretching roller, wherein each disc forms a part of the circumferential profile of the stretching roller at its respective axial position, wherein each disc is interchangeable with another disc having a different diameter to vary the circumferential profile formed by the plurality of discs.

18. The stretching device according to claim 17, wherein the stretching device is further provided with a heater for heating the stretching roller, at least at the circumferential profile thereof, and wherein at least some of the plurality of discs are operationally coupled to and heated by the heater.

19. The stretching device according to claim 1, wherein the stretching device is further provided with a pressing roller for pressing the apex filler strip against the circumferential profile of the stretching roller.

20. The stretching device according to claim 1, wherein the stretching device is further provided with an additional stretching assembly with a first hold-down roller and a second hold-down roller arranged opposite to the circumferential profile for holding down the apex filler strip on said circumferential profile, wherein the additional stretching assembly comprises a further stretch roller in between the hold-down rollers, wherein the further stretch roller is arranged for receiving the part of the apex filler strip between the hold-down rollers in a loop around its circumference, and wherein the further stretch roller is arranged to further stretch the tip of apex filler strip.

21. The stretching device according to claim 20, wherein the further stretch roller is adjustable such that its rotation axis can be set to an angle that is opposite to the support angle of the circumferential profile.

22. The stretching device according to claim 20, wherein the stretching device is arranged for receiving the apex filler strip in an entry direction and for discharging the apex filler strip in an exit direction, wherein entry to the stretching device in the entry direction and exit from the stretching device in the exit direction are realized radially on the same side of the stretching roller, wherein stretching roller is arranged for receiving the apex filler strip in a loop around its circumference between the entry direction and the exit direction, wherein the additional stretching assembly is arranged at the side of the stretching roller at or near the location where the apex filler strip is arranged to leave the circumferential profile in the exit direction.

23. An apex handling system comprising the stretching device according to claim 1, further comprising a festooner with a plurality of upper rollers and lower rollers rotatable about a plurality of respective rotation axes, wherein the festooner is arranged for discharging the apex filler strip into the stretching device in the entry orientation.

24. The apex handling system according to claim 23, wherein the plurality of upper rollers and lower rollers each have rotation axes which are parallel to the rotation axis of the stretching roller, wherein the stretching device is placed in line with the festooner to form a continuation of said festooner, and wherein the festooner ends with a lower roller upstream of the stretching device, wherein the stretching roller acts as a further upper roller interacting with the directly upstream lower roller of the festooner.

25. The apex handling system according to claim 23, wherein the apex handling system further comprises an apex applicator for applying the apex filler strip to the bead, and wherein the apex applicator comprises a conveyor for receiving the apex filler strip from the stretching device in the exit orientation.

26. A stretching device for stretching an apex filler strip prior to application to a bead for a tire, wherein the apex filler strip, in cross section, is provided with a base portion, a tip, a tapering portion extending from the base portion to the tip and two sides defined by the tapering portion, wherein the stretching device comprises a stretching roller that is rotatable about a rotation axis and a plurality of guides for guiding the apex filler strip in a loop around a part of the circumference of the stretching roller, wherein the stretching roller is provided with a circumferential profile that is arranged for supporting the apex filler strip in the loop at one of its two sides in a stretching orientation with the one side under a support angle with respect to the rotation axis of the stretching roller and with its tip radially outside of the base portion with respect to the rotation axis of the stretching roller for stretching said tip, wherein the plurality of guides is arranged for receiving the apex filler strip in an entry orientation towards the stretching roller and for discharging the apex filler strip in an exit orientation away from the stretching roller, wherein the plurality of guides is arranged for guiding the one side of the apex filler strip in the entry orientation and the exit orientation under angles different from the support angle with respect to rotation axis of the stretching roller such that the apex filler strip is twisted in the transition from the entry orientation to the stretching orientation and in the transition from the stretching orientation to the exit orientation over a twisting angle of at least forty-five degrees, wherein the plurality of guides comprises an entry guide for guiding the entry of the apex filler strip into the stretching device in the entry orientation, wherein the entry guide comprises an entry roller with a rotation axis extending parallel to the rotation axis of the stretching roller, wherein the plurality of guides comprises a first twist guide for guiding the twisting of the apex filler strip in the transition between the entry orientation and the stretching orientation, wherein the first twist guide comprises a first twist roller with a rotation axis extending transverse or perpendicular to the rotation axis of the stretching roller, wherein the plurality of guides comprises a second twist guide for guiding the twisting of the apex filler strip in the transition between the stretching orientation and the exit orientation, wherein the second twist guide comprises a second twist roller with a rotation axis extending transverse or perpendicular to the rotation axis of the stretching roller, and wherein the rotation axes of the first twist guide and the second twist guide are parallel or collinear.

27. The stretching device according to claim 26, wherein the support angle is at least fifty degrees, at least sixty degrees or at least seventy degrees.

28. The stretching device according to claim 26, wherein the first twist guide is arranged between the entry guide and the stretching roller.

29. The stretching device according to claim 26, wherein the stretching roller comprises a plurality of discs with different diameters which are arranged to be concentrically mounted in successive axial positions along the rotation axis of the stretching roller, wherein each disc forms a part of the circumferential profile of the stretching roller at its respective axial position, wherein each disc is interchangeable with another disc having a different diameter to vary the circumferential profile formed by the plurality of discs.

30. The stretching device according to claim 26, wherein the stretching device is further provided with a pressing roller for pressing the apex filler strip against the circumferential profile of the stretching roller.

* * * * *